(12) United States Patent
Singh et al.

(10) Patent No.: US 6,587,536 B1
(45) Date of Patent: Jul. 1, 2003

(54) METHOD AND APPARATUS FOR MAXIMIZING RADIATION SHIELDING DURING CASK TRANSFER PROCEDURES

(75) Inventors: Krishna P. Singh, Palm Harbor, FL (US); Stephen J. Agace, Maple Shade, NJ (US)

(73) Assignee: Holtec International, Inc., Marlton, NJ (US)

( * ) Notice: Subject to any disclaimer, the term of this patent is extended or adjusted under 35 U.S.C. 154(b) by 0 days.

(21) Appl. No.: 10/101,028

(22) Filed: Mar. 18, 2002

(51) Int. Cl.$^7$ .............................................. G21C 19/00
(52) U.S. Cl. ...................... 376/261; 376/260; 376/264; 376/272
(58) Field of Search ................................ 376/268–272, 376/262, 264; 250/506.1, 506.7

(56) References Cited

U.S. PATENT DOCUMENTS

| | | | | |
|---|---|---|---|---|
| 3,765,549 A | * | 10/1973 | Jones .......................... | 376/264 |
| 3,910,006 A | * | 10/1975 | James ......................... | 376/261 |
| 3,917,953 A | * | 11/1975 | Wodrich .................... | 250/506.1 |
| 3,962,587 A | * | 6/1976 | Dufrane et al. ........... | 250/506.1 |
| 4,288,698 A | * | 9/1981 | Baatz et al. ............... | 250/506.1 |
| 4,336,460 A | * | 6/1982 | Best et al. ................. | 250/506.1 |
| 4,450,134 A | * | 5/1984 | Soot et al. .................. | 376/203 |
| 4,800,062 A | * | 1/1989 | Craig et al. ................ | 376/272 |
| 5,513,232 A | * | 4/1996 | Jones et al. ................ | 376/272 |
| 5,546,436 A | * | 8/1996 | Jones et al. ................ | 376/272 |
| 5,646,971 A | * | 7/1997 | Howe ......................... | 376/272 |
| 5,661,768 A | * | 8/1997 | Gilligan et al. ............ | 376/261 |

* cited by examiner

Primary Examiner—Michael J. Carone
Assistant Examiner—Rick Palabrica
(74) Attorney, Agent, or Firm—Michael B. Fein; Cozen O'Connor

(57) ABSTRACT

An apparatus and method for maximizing the radiation shielding for spent nuclear fuel during cask transfer procedures. In one aspect, the method comprises submersing an apparatus having a jacket and a cavity for receiving spent nuclear fuel into a pool, wherein the jacket is empty and hermetically sealed; placing spent nuclear fuel into the cavity of the apparatus; lifting the apparatus from the pool; placing the apparatus in a staging area; filling the jacket with neutron absorbing liquid; draining the pool water from the cavity; and lifting the apparatus from the staging area. In another aspect, the invention is an apparatus comprising a cylindrical inner shell forming a cavity within which spent nuclear fuel can be placed; a cylindrical outer shell concentric with and surrounding the inner shell to form an annulus with the inner shell, the annulus adapted for receiving gamma absorbing material; a jacket shell concentric with and surrounding the second shell to form a jacket for holding a neutron absorbing liquid; and the jacket shell having a filling means and a drainage means.

9 Claims, 4 Drawing Sheets

METHOD AND APPARATUS FOR MAXIMIZING RADIATION SHIELDING DURING CASK TRANSFER PROCEDURES

BACKGROUND OF THE INVENTION

This invention relates to the field of transporting spent nuclear fuel and specifically to maximizing radiation shielding during spent nuclear fuel transfer procedures.

In the operation of nuclear reactors, it is customary to remove fuel assemblies after their energy has been depleted down to a predetermined level. In the commercial nuclear industry, fuel assemblies are typically an assemblage of long, hollow, zircaloy tubes filled with enriched uranium. Upon depletion and subsequent removal, spent nuclear fuel is still highly radioactive and produces considerable heat, requiring that great care be taken in its packaging, transporting, and storing. Specifically, spent nuclear fuel emits extremely dangerous neutrons and gamma photons. It is imperative that these neutrons and gamma photons be contained at all times.

Upon defueling a nuclear reactor, spent nuclear fuel is placed in a canister that is submerged in a storage pool. The storage pool facilitates cooling of the spent nuclear fuel and provides radiation shielding that helps contain the emitted neutrons and gamma photons. Generally, canisters are cylindrical steel containers with flat bottoms. A typical canister can hold approximately 24 PWR fuel assemblies or 60 BWR fuel assemblies. When fully loaded with spent nulclear fuel, a canister weighs approximately 45 tons. However, a canister alone does not provide adequate containment of the neutrons and gamma photons emitted by the spent nuclear fuel contained therein. As Such, a loaded canister cannot be further transported from the storage pool without some additional radiation shielding. Because it is preferable to store spent nuclear fuel in a "dry state," the canister must eventually be removed from the storage pool. As such, apparatus that provide additional radiation shielding during transport and long-term dry storage of the spent nuclear fuel are necessary.

In state of the art facilities, additional radiation shielding is achieved by placing the loaded canisters in large cylindrical containers called casks. There are two types of casks used in the industry today, storage casks and transfer casks. A transfer cask is used to transport canisters of spent nuclear fuel from location to location while a storage cask is used to store spent nuclear fuel in the "dry state" for long periods of time. Both transfer casks and storage casks are designed to shield the environment from the neutron and gamma radiation emitted by the spent nuclear fuel through the use of two principles.

First, the gamma radiation emitted by spent nuclear fuel is blocked by placing mass in its way, the greater the density and thickness of the blocking mass, the more effective the attenuation of the gamma radiation. Examples of effective gamma absorbing materials are concrete, lead, and steel. Second, the neutrons emitted by spent nuclear fuel are blocked by placing a material containing hydrogen atoms in their path. As such, any material rich in hydrogen is an effective neutron shield. One example of an effective neutron absorbing material is water.

Guided by the above principles, storage casks are designed to be large, heavy structures made of steel, lead, concrete and an environmentally suitable hydrogenous material. However, because the focus in designing a storage cask is to provide adequate radiation shielding for the long-term storage of spent nuclear fuel, size and weight are often secondary considerations (if considered at all). As a result of maximizing the thickness of the gamma and neutron absorbing materials, the weight and size of storage casks often cause problems associated with lifting and handling. Typically, storage casks weigh approximately 150 tons and have a height greater than 15 ft. A common problem is that storage casks are often too heavy for the capacity of most nuclear power plant cranes and as such cannot be lifted. Another common problem is that storage casks are too large to be placed in storage pools. Thus, in order to store spent nuclear fuel in a storage cask, a loaded canister must be removed from the storage pool, prepared in a staging area, and transported to the storage cask. Additional radiation shielding is needed throughout all stages of this procedure.

Removal from the storage pool and transport of the loaded canister to the storage cask is facilitated by a transfer cask. In facilities utilizing transfer casks to transport loaded canisters, an empty canister is placed into an open transfer cask. The canister and transfer cask are then submerged in the storage pool. As each assembly of spent nuclear fuel is depleted, it is removed from the reactor and lowered into the storage pool and placed in the submerged canister (which is within the transfer cask). The loaded canister is then fitted with its lid, enclosing the spent nuclear fuel and water from the pool within. The enclosed water provides neutron radiation shielding for the spent nuclear fuel once the transfer cask is removed from the pool. The canister and transfer cask are then removed from the pool by a crane and set down in a staging area to prepare the spent nuclear fuel for storage in the "dry state." Once in the staging area, the water contained in the canister is pumped out of the canister. This is called dewatering. Once dewatered, the spent nuclear fuel is allowed to dry. Once dry, the canister is back-filled with an inert gas such as helium. The canister is then sealed and the canister and the transfer cask are once again lifted by the plant's crane and transported to the storage cask. The transfer cask is placed atop the storage cask and the canister is lowered through a bottom opening in the transfer cask into the storage cask.

Because a transfer cask must be lifted and handled by a plant's crane (or other equipment), transfer casks are designed to be a smaller and lighter than storage casks. A transfer cask must be small enough to fit in a storage pool and light enough so that, when it is loaded with a canister of spent nuclear fuel, its weight does not exceed the crane's rated weight limit. Additionally, a transfer cask must still perform the important function of providing adequate radiation shielding for both the neutron and gamma radiation emitted by the enclosed spent nuclear fuel. As such, transfer casks are made of a gamma absorbing material such as lead and contain a neutron absorbing material. While the pool water sealed in the canister does provide some neutron shielding, this water is eventually drained at the staging area. As such, many transfer casks have either a separate layer of neutron absorbing material or have an annulus filled with water that surrounds the cavity of the transfer cask in which the loaded canister is located.

As stated earlier, the greater the thickness and density of the neutron and gamma absorbing materials, the greater the radiation shielding provided thereby. However, increasing the density and/or thickness of the materials used to make the transfer cask also results in the weight of the cask being increased. Thus, the extent of radiation shielding provided by a transfer cask is directly related to the transfer cask's weight. The greater the radiation shielding the greater the weight of the cask.

However, the allowable weight of a transfer cask is limited by the lifting capacity of the plant's crane (or other lifting equipment). The load handled by the crane includes not only the weight of the transfer cask itself, but also the weight of the transfer cask's payload (i.e., the canister and its contents). A transfer cask must be designed so that the total load handled by the crane during all handling evolutions does not exceed the crane's rated weight limit, which is typically in the range of 100–125 tons. As such, the permissible weight of a transfer cask is equal to the rated capacity of the plant crane less the weight of its payload. Moreover, it is important to note that when the combined weight of a transfer cask and its payload is equal to the rated lifting capacity of the plant crane, the possible radiation shielding that can be provided by a transfer cask is at a maximum for that particular payload. This is because the thickness of the gamma and neutron absorbing materials are at a maximum for that crane and that payload.

Because the weight of the transfer cask's payload varies during the different stages of the transport procedure, the permissible weight of the transfer cask is equal to the rated capacity of the plant crane less the weight of the transfer cask's maximum payload at any lifting step. The weight of the transfer cask's payload is at a maximum when the transfer cask and canister are lifted out of the storage pool, at which time the canister is full of spent nuclear fuel and water. Thus, according to prior art methods, it is at this stage that the permissible weight of a transfer cask is calculated. The transfer cask is then constructed using this permissible weight as a design limitation.

However, when the transfer cask is set down in the staging area, the pool water is removed from the canister. Upon completion of dewatering the canister, the weight of the transfer cask's payload is reduced below the rated capacity of the crane, and remains so throughout the rest of the transport procedure. As such, the radiation shielding capacity provided by the transfer cask is sub-par throughout the rest of the procedure when compared to a heavier transfer cask, the weight of which would subsume the available crane capacity. However, a heavier transfer cask can not be used throughout the entire transport procedure because of the fact that the combined weight of the heavier transfer cask and its payload would exceed the rated lifting capacity of the crane during the step of initially lifting the transfer cask from the storage pool. Thus, the maximum amount of radiation shielding is not provided throughout every step of the transfer and dry storage procedure.

While it is possible to transfer the canister of spent nuclear fuel to a heavier transfer cask once the payload is lightened from dewatering, this would take added time, money, effort, space, and equipment. An additional transfer would also increase the amount of radiation exposure to personnel and the chances of a handling mishap. Thus a need exists for a transfer cask that can provide the maximum amount of radiation shielding during all stages of transferring spent nuclear fuel from a storage pool to a storage cask for long-term dry storage, even when the weight of the transfer cask's payload is varied. A need also exists for a method of transferring a canister of spent nuclear fuel from a storage pool to a storage cask for long-term dry storage that provides the maximum amount of radiation shielding during all stages of the transfer procedure, even when the weight of the transfer cask's payload is varied.

SUMMARY OF THE INVENTION

It is an object of the present invention to provide an apparatus that can provide the maximum amount of radiation shielding during all stages of a spent nuclear fuel transfer procedure, even when the weight of the apparatus's payload is varied.

Another object of the present invention is to provide an apparatus for transferring spent nuclear fuel, the weight of which can be easily and quickly varied in order to maximize the amount of radiation shielding for a varied payload without substantially increasing the transfer procedure cycle time.

Yet another object of the present invention is to provide an apparatus for transferring spent nuclear fuel that can be lifted and transported by a low-capacity crane and still provide adequate radiation shielding during all stages of the transfer procedure.

Still another object of the present invention is provide a method of transferring a canister of spent nuclear fuel that provides the maximum amount of radiation shielding during all stages of the transfer procedure, even when the weight of the apparatus's payload is varied.

Yet another object of the present invention is to provide a method of transferring a canister of spent nuclear fuel in nuclear power plants having a low capacity crane that provides adequate radiation shielding during all stages of the process.

These objects and others are met by the present invention which in one aspect is an apparatus for transferring spent, radioactive nuclear fuel comprising a cylindrical inner shell forming a cavity within which spent nuclear fuel can be placed; a cylindrical outer shell concentric with and surrounding the inner shell to form an annulus with the inner shell, the annulus adapted for receiving gamma absorbing material; a jacket shell concentric with and surrounding the second shell to form a jacket for holding a neutron absorbing liquid; and the jacket having a filling means and a drainage means.

It is preferable that the drainage means and filling means be adapted so that the jacket can be filled and drained with neutron absorbing liquid during a spent nuclear fuel transfer process. Preferably, the jacket shell of the apparatus has a top and a bottom, the filling means being located at or near the top of the jacket shell and the drainage means being located at or near the bottom of the jacket shell.

The filling means are preferably one or more holes capable of being hermetically sealed. Also preferably, the drainage means is one or more drain valves capable of being opened and hermetically sealed.

The gamma absorbing material is preferably lead and the neutron absorbing liquid is preferably water. The inner shell and outer shell are preferably constructed of carbon steel. It is also preferable that the apparatus further comprise a plurality of radial plates located within the jacket, wherein the radial plates connect the outer shell and the jacket shell. Preferably, the jacket shell is constructed of carbon steel. Also preferably, the annulus is filled with gamma absorbing material.

In another aspect, the invention is a method of transferring spent nuclear fuel from a pool comprising submersing an apparatus having a jacket, a cavity, and a canister within the cavity, for receiving spent nuclear fuel into a pool so that the canister fills with pool water, wherein the jacket is empty and hermetically sealed; placing spent nuclear fuel into the canister; lifting the transfer cask from the pool; placing the transfer cask in a staging area; filling the jacket with neutron absorbing liquid; draining the pool water from the canister, thereby reducing the weight of the transfer cask; and lifting the apparatus from the staging area.

Preferably, the method further comprises draining the neutron absorbing liquid from the jacket; hermetically sealing the jacket; and submersing the transfer cask in the pool for another load of spent nuclear fuel.

It is preferable that the jacket is drained by activating drainage means being located at or near the bottom of the jacket. Preferably, the drainage means is one or more drain valves which are hermetically sealed when the transfer cask is in the pool and after the jacket is filled.

Also preferably, the jacket is filled by introducing neutron absorbing liquid through the filling means being located near the top of the jacket. The filling means can be one or more holes which are hermetically sealed when the transfer cask is in the pool and after the jacket is filled.

The method preferably further comprises backfilling the canister with an inert gas once the pool water is drained. It is also preferable for the method to further comprise positioning the transfer cask above a storage cask; and transferring the canister from the transfer cask to the storage cask. Alternatively, the method can further comprise positioning the transfer cask above a transport cask; and transferring the canister from the transfer cask to the transport cask.

DETAILED DESCRIPTION

Figure 1:
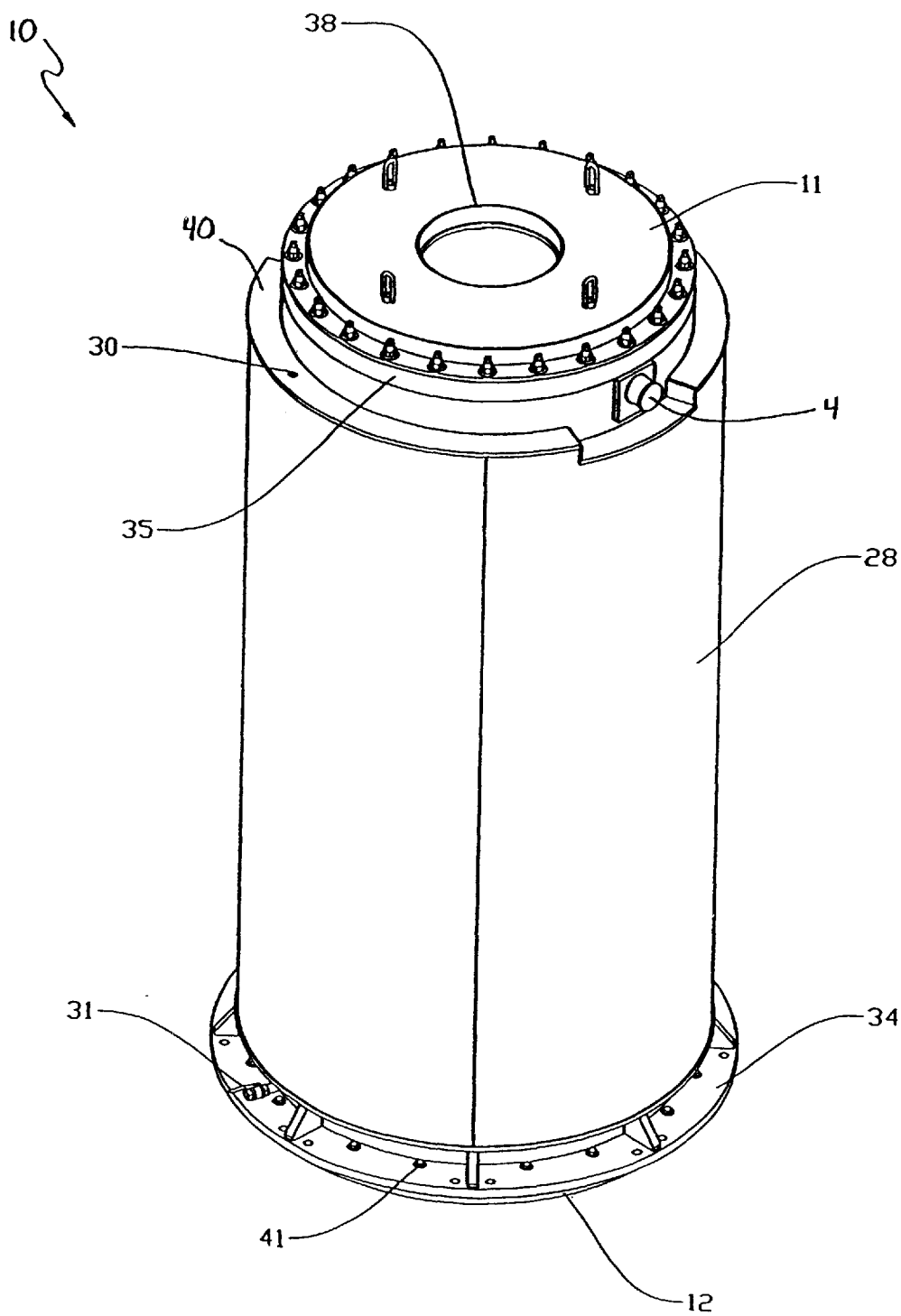
FIG. 1 is perspective view of an embodiment of the apparatus of the present invention, a transfer cask with a drainable jacket.
Figure 2:
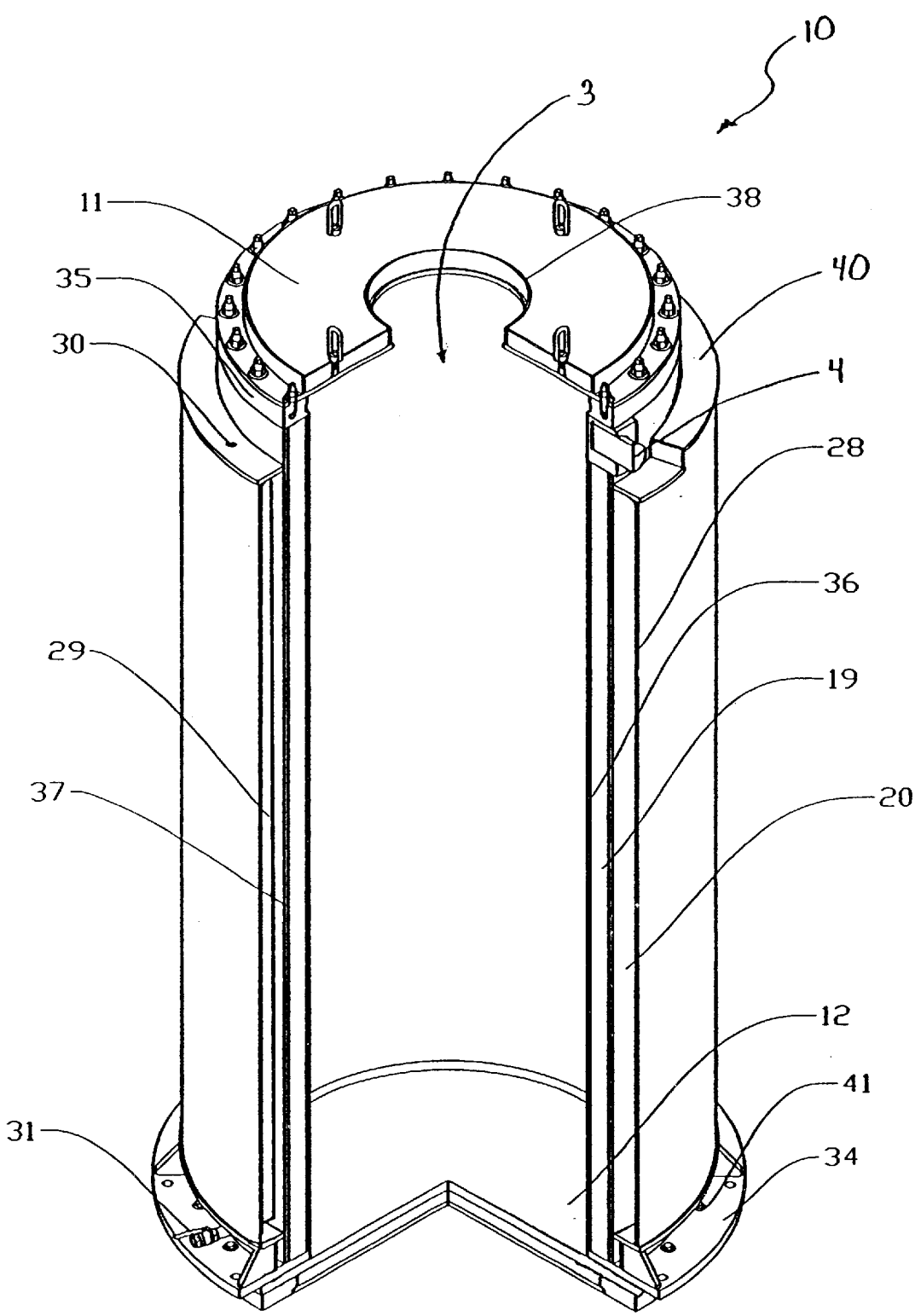
FIG. 2 is a perspective view of an embodiment of the apparatus of the present invention, a transfer cask with a drainable jacket partially in section.

FIG. 1 illustrates an embodiment of the apparatus of the present invention, wherein cylindrical transfer cask 10 having a drainable jacket defined by jacket shell 28. A cask lid 11 is removable during the loading step. Cask lid 11 has lid opening 38 for facilitating access to cavity 3 (FIG. 2). Bottom lid 12 is secured to bottom flange 34 by a plurality of bolts 41 that extend through holes in bottom flange 34 and threadily engage bottom lid 12. Handles 4 are provided for attaching the crane.

Transfer cask 10 and jacket shell 28 have a top and bottom. As used herein throughout, "top" refers to the ends of jacket shell 28 and cask 10 that are closest in proximity to top flange 35, while "bottom" refers to the ends of jacket shell 28 and cask 10 that are closest in proximity to bottom flange 34.

Referring to FIG. 2, transfer cask 10 comprises cylindrical inner shell 36. Along with bottom lid 12, cylindrical inner shell 36 forms cavity 3 within which a canister of spent nuclear fuel can be placed when cask lid 11 is removed. Transfer cask 10 further comprises cylindrical outer shell 37 which is concentric with and surrounds inner shell 36. Both inner shell 36 and outer shell 37 are made from carbon steel. Inner shell 36 and outer shell 37 are welded to top flange 35 and bottom flange 34, forming an annulus 19 that is capable of holding gamma absorbing material such as concrete, lead, or steel. Lead is preferred because it most effectively provides gamma shielding for the radioactive spent nuclear fuel once it is placed within cavity 3.

Transfer cask 10 further comprises jacket shell 28. Jacket shell 28 is concentric with and surrounds outer shell 37. Jacket shell 28 has top surface 40. The bottom of jacket shell 28 is welded to bottom flange 34 while top surface 40 is welded to outer shell 37, forming a second annulus 20, referred to herein as "jacket 20." Jacket 20 is adapted for receiving a neutron absorbing liquid such as water, which provides a layer of neutron shielding for the radioactive spent nuclear fuel once it is placed in cavity 3.

In order to facilitate easy filling and draining of jacket 20, jacket shell 28 further comprises one or more drain valve 31 and one or more fill holes 30. Fill hole 30 is located on top surface 40 and extends through top surface 40, providing an opening into jacket 20. Drain hole 30 is large enough so that it can be used to fill jacket 20 with water in an amount of time that does not substantially increase the cycle time required to prepare a canister of spent nuclear fuel for dry storage. Fill hole 30 can be closed and hermetically sealed by inserting a properly sized plug therein.

Drain valve 31 is located at or near the bottom of jacket shell 28 and is fluidly connected to jacket 20 (i.e., the second annulus). Drain valve 31 is adapted so as to have both an open and a closed position. When closed, drain valve 31 is hermetically sealed. When open, fluid contained in jacket 20 can freely flow through drain valve 31, thus draining any water contained in jacket 20. The size and maximum flowrate of drain valve 31 is chosen so that when jacket 20 is filled with water, it can be completely drained without substantially increasing the cycle time required to prepare a canister of spent nuclear fuel for dry storage. Moreover, when drain valve 31 and fill hole 30 are hermetically sealed, jacket 20 is also hermetically sealed.

The positioning of drain valve 31 at or near the bottom of jacket shell 28, and the positioning of fill hole 30 at or near the top of jacket shell 28, make it possible to easily fill or drain the jacket while keeping transfer cask 10 in an upright position (i.e., resting on its bottom end). As such, when transfer cask 10 is being used to transport a canister of spent nuclear fuel, jacket 20 can be filled or drained without increasing the transport time substantially. Moreover, the positioning of drain hole 30 and drain valve 31 make it possible to drain and fill jacket 20 without employing special pumping equipment.

Additionally, transfer cask 10 comprises a plurality of radial plates 29 that extend radially from outer shell 37 to jacket shell 28. The radial plates are circumferentially located around transfer cask 10. Each radial plate 29 is welded on one side to outer shell 37 and to jacket shell 28 on the other side. Radial plates 29 act as fins for improved heat conduction.

Figure 3:
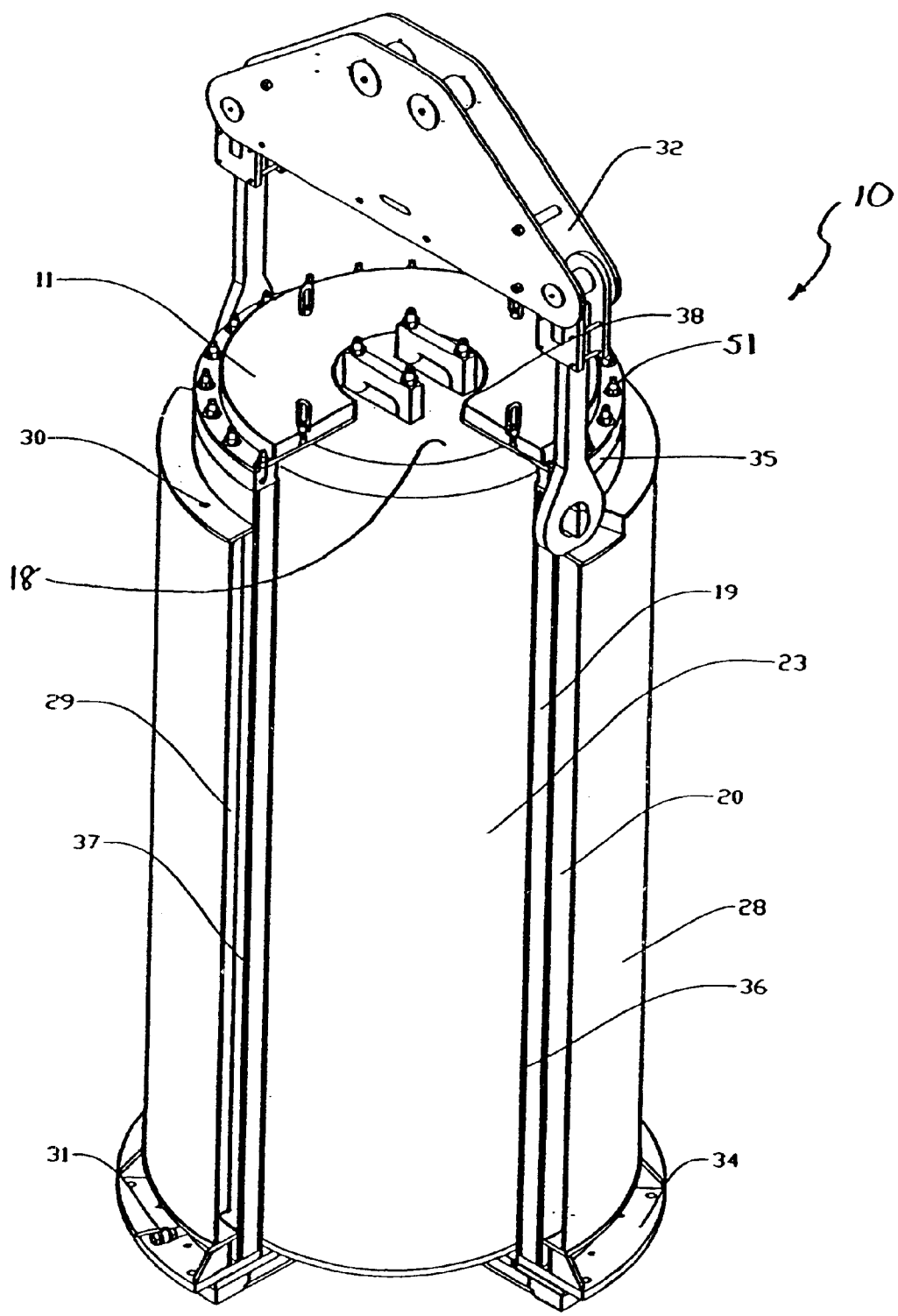
FIG. 3 is a perspective view of a transfer cask with a drainable jacket partially in section having a canister of spent nuclear fuel located therein.

Referring to FIG. 3, transfer cask 10 is adapted to be capable of receiving a canister 23 filled with spent nuclear fuel in cavity 3 (FIG. 2) when cask lid 11 is removed. Canister 23 has canister lid 18. Once canister 23 is placed in transfer cask 10, cask lid 11 can be secured to top flange 35. Cask lid 11 is secured to top flange 35 by extending bolts 51 through holes in cask lid 11 and threadily engaging top flange 35. Transfer cask 10 and its payload (i.e., canister 23 and its contents) are lifted and handled by power plant crane 32. Crane 32 lifts and handles transfer cask 10 and its payload by engaging handles 4. Lid opening 38 provides access to canister 23 for performing certain handling operations of canister 23 while cask lid 11 is secured to top flange 35.

Figure 4:
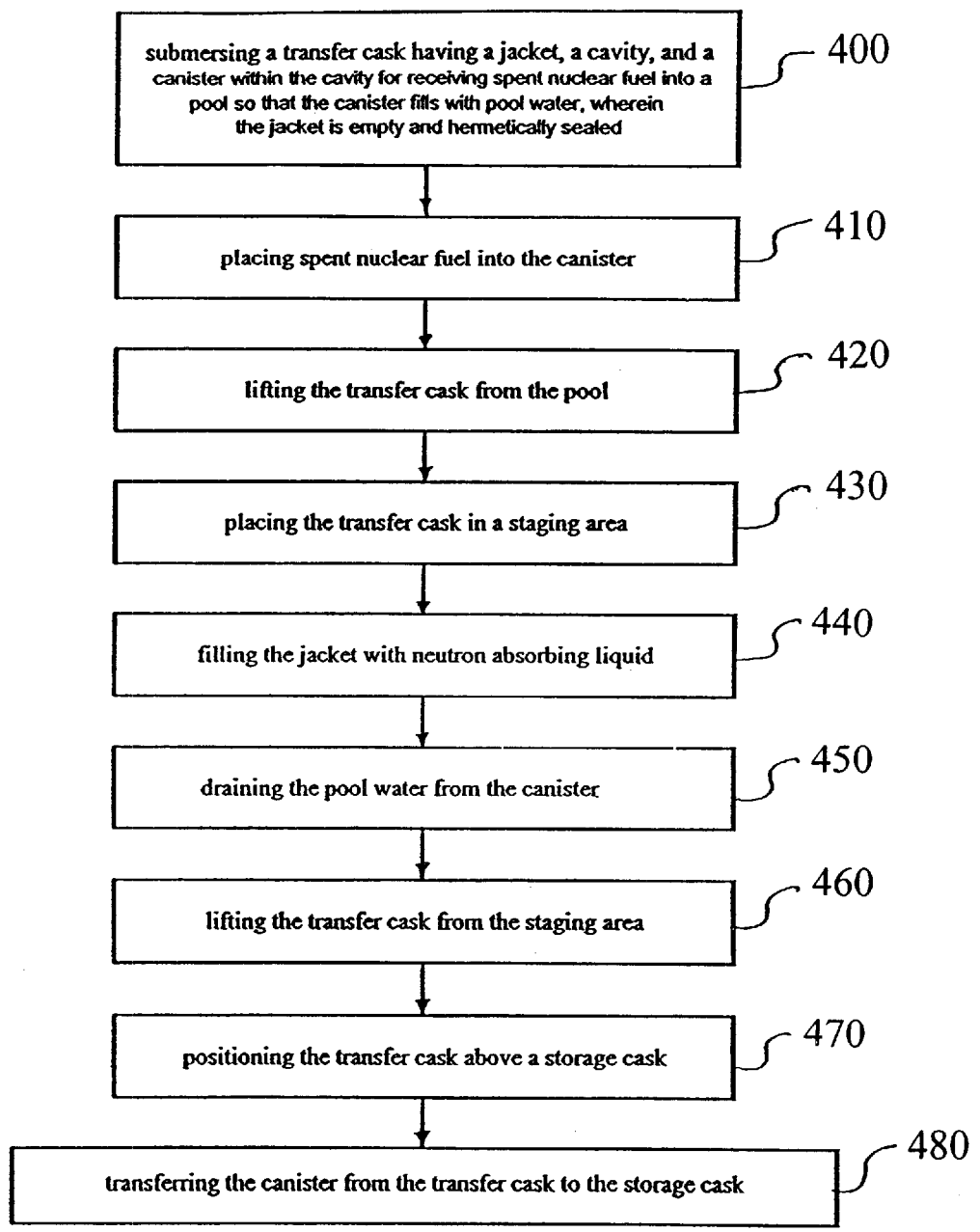
FIG. 4 is a flowchart of an embodiment of the method of the present invention, providing the maximum amount of radiation shielding during all stages of transferring a canister of spent nuclear fuel from a storage pool to a storage cask for long-term dry storage, even when the weight of the transfer cask's payload is varied during the transfer procedure.

FIG. 4 is a flowchart of an embodiment of the method of the present invention, providing the maximum amount of radiation shielding during all stages of transferring a canister of spent nuclear fuel from a storage pool to a storage cask for long-term dry storage, even when the weight of the transfer cask's payload is varied during the transfer procedure. The steps of FIG. 4 will be discussed in relation to the apparatus embodiment shown in FIGS. 1–3.

In defueling a nuclear reactor and storing the spent nuclear according to the method of the present invention illustrated in FIG. 4, canister 23 is first placed in cavity 3 of transfer cask 10 without its lid 18. At this point, jacket 20 of transfer cask 10 is empty and hermetically sealed by closing drain valve 31 and sealing drain hole 30 with a plug. Annulus 19, is filled with lead. Transfer cask 10 and open canister 23 are then submerged into a storage pool, completing step 400.

As the nuclear reactor uses up the nuclear fuel, the spent nuclear fuel is removed from the reactor, lowered into the storage pool, and placed in canister 23, completing step 410. Once canister 23 is fully loaded, lid 18 is secured to canister 23, enclosing both the spent nuclear fuel and water from the pool therein. Crane 32 is lowered into the pool and secured to handles 4 of transfer cask 10. Once secured to handles 4, crane 32 lifts transfer cask 10 and its current payload out of the storage pool, completing step 420. Transfer cask 10 is designed so that at this stage in the transfer procedure, the combined weight of transfer cask 10 and its payload is equal to or less than the rated lifting capacity of crane 32.

Once lifted out of the storage pool, crane 32 sets transfer cask 10 and its payload down in a staging area, completing step 430. At this point, canister 23 contains the pool water in addition to the spent nuclear fuel. As discussed earlier, this pool water acts as a neutron absorbing layer as long as it is in canister 23. Despite providing neutron shielding, this pool water must be removed from canister 23 in order to store the spent nuclear fuel in a dry-state, eliminating any neutron shielding provided thereby. However, according to the method of the present invention, jacket 20 is filled with water before the pool water is pumped out of canister 23. Jacket 20 is filled with water by removing the plug from fill hole 30 and supplying water therethrough, completing step 440.

Upon jacket 20 being filled with water, fill hole 30 is sealed with its plug once again. At this point, the pool water contained in canister 23 is pumped out, completing step 450. The water within jacket 20 now provides the necessary neutron shielding for the remainder of the transfer procedure. The spent nuclear fuel contained therein is allowed to dry and canister 23 is then backfilled with an inert gas such as helium. Cask lid 11 is then secured to transfer cask 10.

Transfer cask 10 is then lifted by crane 32, completing step 460. If the spent nuclear fuel is going to be stored long-term, transfer cask 10 is transported by crane 32 and positioned above a storage cask, completing step 470. Once properly positioned above the storage cask, bottom lid 12 is removed and canister 23 is lowered into the storage cask, completing step 480. Alternatively, transfer cask 10 can be used to transport the spent nuclear fuel a transport cask for moving spent nuclear fuel over long distances using a similar procedure.

Once canister 23 is removed from transfer cask 10, transfer cask 10 can be reused to perform the above described procedure again. If transfer cask 10 is going to be reused, the water is drained from jacket 20 by opening drain valve 31. Cask lid 11 is then removed and drain valve 31 is moved to the closed position, hermetically sealing jacket 20. The procedure is then started over.

The method and apparatus of the invention allow for the combined weight of the transfer cask and its load to be approximately equal to the rated lifting capacity of the crane at all stages of the transfer procedure. This is desirable because the greater the weight of the transfer cask, the greater the amount of radiation shielding. For example, suppose a canister loaded with spent nuclear fuel and pool water weighs 45 tons when lifted in step 420. If the rated lifting capacity of the crane is 125 tons, the transfer cask must weigh 80 tons in order to maximize radiation shielding at this stage. Now suppose that once the transfer cask is set down and the pool water removed from the canister, that the canister and its contents weigh 25 tons. The combined weight of the transfer cask and its payload would only weigh 105 tons at this stage. This is 20 tons less than the rated lifting capacity of the crane. This 20 tons of available crane capacity is unused for the remainder of the transfer procedure when using prior art methods, resulting in a less than maximum amount of radiation shielding. However, according to the present invention, 20 tons of water can be added to the jacket, increasing the combined weight of the transfer cask and its payload so that it is equal to the lifting capacity of the crane. Thus, keeping the possible radiation shielding at maximum capacity for that payload and that crane during the entire transfer procedure.

The present invention allows for a thicker a layer of gamma absorbing material to be used in constructing a transfer cask. For example, suppose a crane capacity of 125 tons and a transfer cask payload weight of 45 tons during step 420 (the weight of the canister, spent nuclear fuel, and pool water). This leaves 80 tons for the weight of the transfer cask. A transfer cask must provide both gamma and neutron radiation shielding. While the pool water trapped in the canister provides adequate neutron shielding, this water must be drained in order to store the spent nuclear fuel in a dry-state. Prior art casks have both a layer of gamma absorbing material and a separate layer of neutron absorbing material at all times so that the weight of both of these layers is included in designing a prior art transfer cask to be under 80 tons. If a layer of neutron absorbing material weighing 20 tons is needed to provide adequate neutron shielding once the pool water is drained from the canister, a total of 60 tons is available to make the rest of the transfer cask. Supposing the carbon steel frame of the transfer cask weighs 15 tons, this leaves 45 tons to be used for creating the gamma absorbing layer for the prior art transfer cask.

However, according to the present invention, at no time during a crane lifting operation does the transfer cask have both the enclosed pool water and the separate layer of neutron absorbing liquid. This allows for a greater weight of gamma absorbing material to be used in designing the transfer cask. Because the combined weight of the transfer cask and its payload is not at its heaviest during the step 420 lift (because the jacket is empty), the acceptable weight of the gamma absorbing layer is not calculated at this step. Instead, the acceptable weight of gamma absorbing layer is calculated for the lift at step 460, when the pool water has been drained from the canister and the jacket has been filled with water. Assuming that 20 tons of pool water has been drained from the canister during step 450, the weight of the transfer cask's payload is 25 tons during step 460. Assuming a rated lifting capacity of 125 tons for the crane, the transfer cask's permissible weight can be 100 tons. As above, assuming that 20 tons of a neutron absorbing liquid is needed to provide adequate neutron shielding, and that the carbon steel frame weighs 15 tons, 65 tons is left for constructing the gamma shielding layer when using the present invention. This is opposed to the mere 45 tons allowed in the prior art for the identical payload. Because the gamma shielding layer can be heavier, it can also be thicker, thus, providing greater gamma radiation shielding.

Another benefit of the present invention is that a lower capacity crane can be used to transfer loads of spent nuclear fuel that could not previously be used. If a crane has a rated lifting capacity of 100 tons and safety standards require a transfer cask to have a 20 ton layer of neutron absorbing material and a 35 ton layer of gamma absorbing material, and if the carbon steel frame of the transfer cask weighs 15 tons, the total weight of the transfer cask must be at least 70 tons. However, if the canister and its contents (i.e., the spent nuclear fuel and pool water) at step 420 weigh 45 tons, the combined weight of the transfer cask and its payload will exceed the crane's lifting capacity, in which case a 100 ton capacity crane can not be used to transfer the spent nuclear fuel using prior art procedures and apparatus.

Using the same numbers for a power plant utilizing the present invention, and assuming that the jacket of the transfer cask is empty during step 420, the weight of the transfer cask will be 50 tons and the combined weight of the transfer cask (50 tons) and its payload (45 tons) is only 95 tons, a weight capable of being lifted by the 100 ton capacity crane. Assuming that 20 tons of water is removed from the canister during step 450, and 20 tolls of water is added to the jacket, the combined weight of the transfer cask and its payload is still below the rated lifting capacity of the 100 ton crane. Thus, using the present invention enables smaller cranes that would otherwise be unable to perform the spent nuclear fuel transfer to do so.

The foregoing discussion discloses and describes merely exemplary embodiments of the present invention. As will be understood by those skilled in this art, the invention may be embodied in other specific forms without departing from the spirit or essential characteristics thereof Accordingly, the disclosure of the present invention is intended to be illustrative, but not limiting, of the scope of the invention, which is set forth in the following claims.

What is claimed is:

1. A method of transferring spent nuclear fuel from a pool comprising:

submersing a transfer cask having a jacket, a cavity, and a canister within the cavity for receiving spent nuclear fuel into a pool so that the canister fills with pool water, wherein the jacket is empty and hermetically sealed;

placing spent nuclear fuel into the canister;

securing a lid on the canister;

lifting the transfer cask from the pool;

placing the transfer cask in a staging area;

filling the jacket with neutron absorbing liquid subsequent to the transfer cask being placed in the staging area;

draining the pool water from the canister; and lifting the transfer cask from the staging area.

2. The method of claim 1 further comprising:

draining the neutron absorbing liquid from the jacket;

hermetically sealing the jacket; and submersing the transfer cask having an empty canister in the cavity in the pool for another load of spent nuclear fuel.

3. The method of claim 2 wherein the jacket is drained by activating drainage means located near a bottom of the jacket.

4. The method of claim 3 wherein the drainage means is one or more drain valves which are hermetically sealed when the transfer cask is in the pool and after the jacket is filled.

5. The method of claim 1 wherein the jacket is filled by introducing neutron absorbing liquid through filling means located near a top of the jacket.

6. The method of claim 5 wherein the filling means are one or more holes which are hermetically sealed when the transfer cask is in the pool and after the jacket is filled.

7. The method of claim 1 further comprising:

backfilling the canister with an inert gas once the pool water is drained.

8. The method of claim 1 further comprising:

positioning the transfer cask above a storage cask; and transferring the canister from the transfer cask to the storage cask.

9. The method of claim further comprising:

positioning the transfer cask above a transport cask; and transferring the canister from the transfer cask to the transport cask.

* * * * *